(12) United States Patent
Chen

(10) Patent No.: US 7,530,496 B2
(45) Date of Patent: May 12, 2009

(54) SURFACE SENSITIVE INPUT DEVICE WITH INDEXES AND COMPUTER SYSTEM USING THE INPUT DEVICE

(75) Inventor: Li-Ming Chen, Keelung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 724 days.

(21) Appl. No.: 11/067,690

(22) Filed: Mar. 1, 2005

(65) Prior Publication Data

US 2006/0055682 A1    Mar. 16, 2006

(30) Foreign Application Priority Data

Sep. 13, 2004    (TW) .............................. 93127645 A
Jan. 12, 2005    (TW) .............................. 94100852 A

(51) Int. Cl.
*G06K 7/10*    (2006.01)
(52) U.S. Cl. .................. 235/454; 235/439; 235/462.03; 235/494
(58) Field of Classification Search .................. 235/439, 235/462.03, 462.01, 462.04, 462.06, 435, 235/494

See application file for complete search history.

(56) References Cited

U.S. PATENT DOCUMENTS

| | | | | |
|---|---|---|---|---|
| 5,260,556 A | * | 11/1993 | Lake et al. .................... | 235/494 |
| 5,416,312 A | * | 5/1995 | Lamoure ...................... | 235/494 |
| 6,786,397 B2 | * | 9/2004 | Silverbrook et al. ......... | 235/375 |
| 7,204,428 B2 | * | 4/2007 | Wilson ........................ | 235/494 |

* cited by examiner

*Primary Examiner*—Seung H Lee
(74) *Attorney, Agent, or Firm*—Bacon & Thomas, PLLC

(57) ABSTRACT

A computer system, which has a host, a surface sensitive input device and an optical reader. The surface sensitive input device can be a display connected to the host for displaying output data of the host on its screen. The surface sensitive input device is divided into plural areas, each area having one or more indexes to represent a respective area code. The indexes are printed on the surface sensitive input device using a readable material to the optical reader. The optical reader is connected to the host and adapted to read the indexes on the surface sensitive input device for sending the indexes read to the host to further process.

23 Claims, 6 Drawing Sheets

SURFACE SENSITIVE INPUT DEVICE WITH INDEXES AND COMPUTER SYSTEM USING THE INPUT DEVICE

BACKGROUND OF THE INVENTION

1. Field of the Invention

The invention relates to a surface sensitive input device with indexes and, more particularly, to a surface sensitive input device with isotropic indexes and a computer systems using the surface sensitive input device.

2. Description of Related Art

Typically, an input device can be a keyboard, a touch screen, a writing board and the like. A user can easily accepts the touch screen and the writing board as being Non-English inputs (such as Chinese inputs), which is more convenient than the keyboard.

The touch screen can be a resistive type, a capacitive type, an ultrasonic wave type, an optical sensitive type, an electromagnetic type, or the like. The resistive touch screen is typically combined to a liquid crystal display (LCD) and widely used as an input device for an electronic notebook, personal digital assistant (PDA) and a portable computer. As compared to other types, the resistive touch screen has the advantages of thin, tight, light and low power consumption.

However, a user requires frequently pressing on the resistive touch screen for input, especially more than one touches are required when used material for the resistive touch screen is increasingly aging, so the resistive touch screen is easily damaged. In addition, the aged resistive touch screen is not easily renewed due to the combined LCD, as well as the writing board.

Therefore, it is desirable to provide an improved input device to mitigate and/or obviate the aforementioned problems.

SUMMARY OF THE INVENTION

An object of the invention is to provide a surface sensitive input device with indexes and a computer system using the surface sensitive input device, which can read the indexes on the input device conveniently and easily.

In accordance with the first aspect of the present invention, there is provided a surface sensitive input device with indexes. The input device is divided into plural areas, each area having one or more indexes with plural indexing dots to represent a respective area code. The indexes, which are printed on the input device, are readable by an optical reader for extraction.

In accordance with the second aspect of the present invention, there is provided a surface sensitive input device with indexes. The input device is divided into plural areas, each area having one or more indexes to represent a respective area code. The indexes are readable by an optical reader, wherein each of the indexes has a center dot, plural direction dots and plural first data dots. The center dot is on a center of the index. The plural direction dots are distributed on a first distance from the center dot. One of the direction dots is a direction recognition dot to indicate an indexing start in clockwise or counterclockwise with respect to the center dot. The plural first data dots are distributed on a second distance from the center dot, wherein the second distance is greater than the first distance.

In accordance with the third aspect of the present invention, there is provided a computer system. The computer system includes a host, a surface sensitive input device and an optical reader. The surface sensitive input device is divided into plural areas, each area having one or more indexes to represent a respective area code. The indexes are printed using special optical reader-readable materials. The optical reader is connected to the host and adapted to read the indexes on the surface sensitive input device, thus the read indexes are sent to the host to further process.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
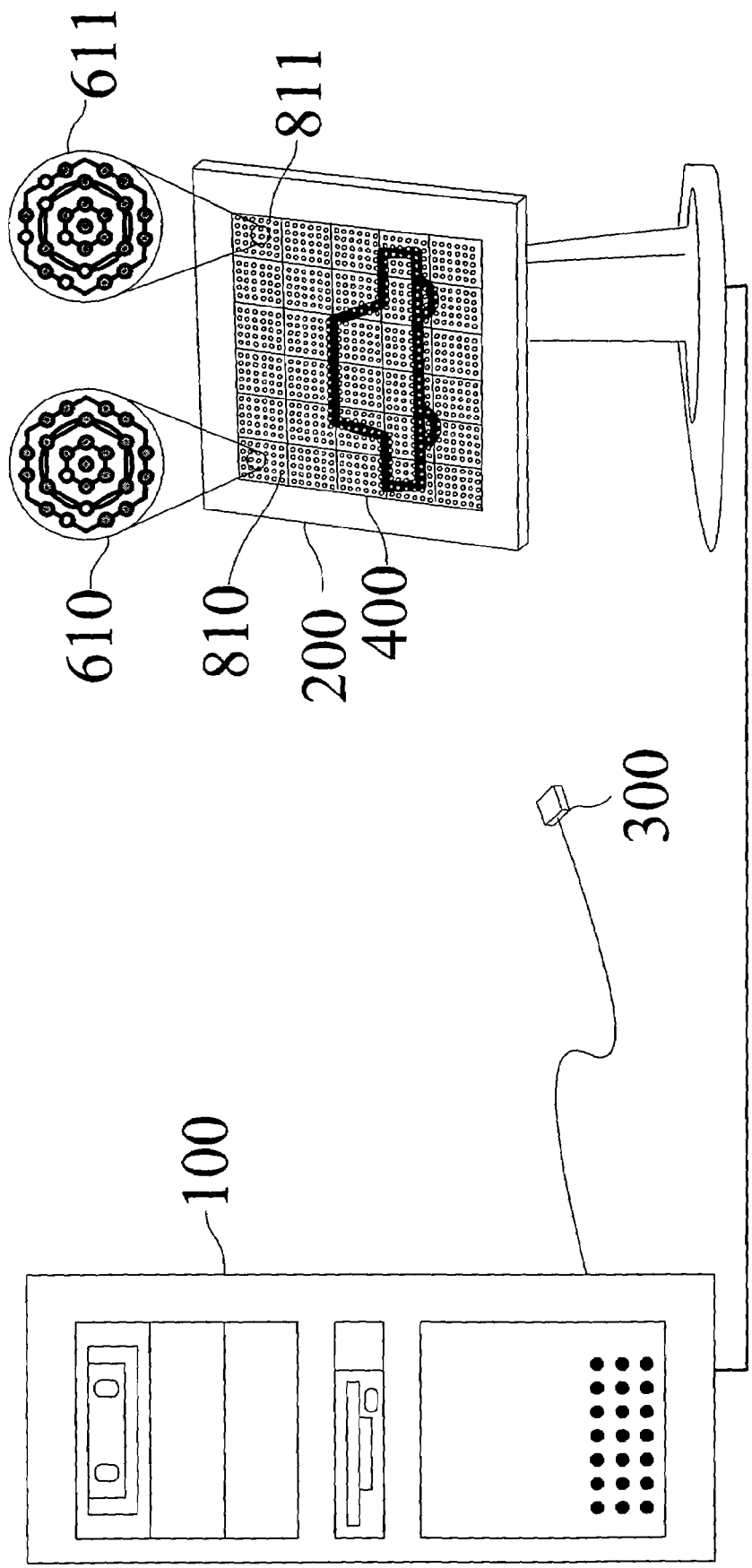
FIG. 1 schematically shows an embodiment of a computer system including a surface sensitive input device with indexes in accordance with the invention.

FIG. 1 schematically shows an embodiment of a computer system including a surface sensitive input device 200 with indexes in accordance with the invention. The computer system includes a host 100, the surface sensitive input device 200 and an optical reader 300. In this embodiment, the surface sensitive input device 200 can be a display connected to the host such that the host can display output data on a screen 400 of the device 200. The screen 400 is divided into plural areas (such as 810, 811), each area having one or more indexes (610, 611) to indicate a respective area code. The indexes are printed using special materials readable to the optical reader 300. The optical reader 300 is connected to the host 100 and adapted to read the indexes on the screen 400, thus the indexes (610, 611) read are sent to the host 100 to further process.

Figure 2:
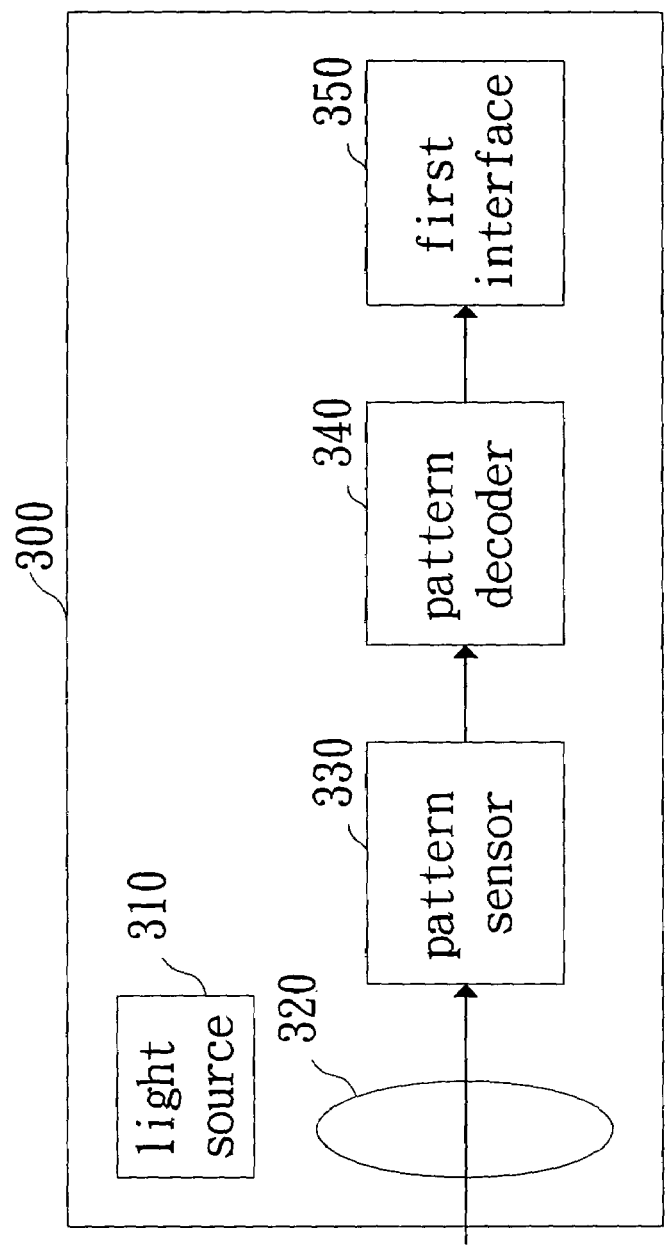
FIG. 2 is a block diagram of an optical reader of FIG. 1 in accordance with the invention.

FIG. 2 is a block diagram of the optical reader 300. In FIG. 2, the optical reader 300 includes a light source 310, a filter 320, a pattern sensor 330, a pattern decoder 340 and a first interface 350. The light source 310 provides a light with a desired wavelength, for example 850 nm~950 nm, to illuminate the screen 400. The filter 320 allows the light (with the wavelength of 850 nm~950 nm) to pass through, wherein the light corresponds to the indexes (610, 611). The pattern sensor 330 is connected to the filter 320 for sensing the light and accordingly forming a pattern to output. The pattern decoder 340 is connected to the pattern sensor 330 for decoding and accordingly obtaining corresponding information of the indexes (610, 611) in accordance with the pattern from the pattern sensor 330. The first interface 350 are coupled between the pattern decoder 340 and the host 100, thus the pattern decoder 340 sends the corresponding information decoded to the host 100 through the first interface 350 in order to obtain a coordinate of the screen 400.

Figure 3A:
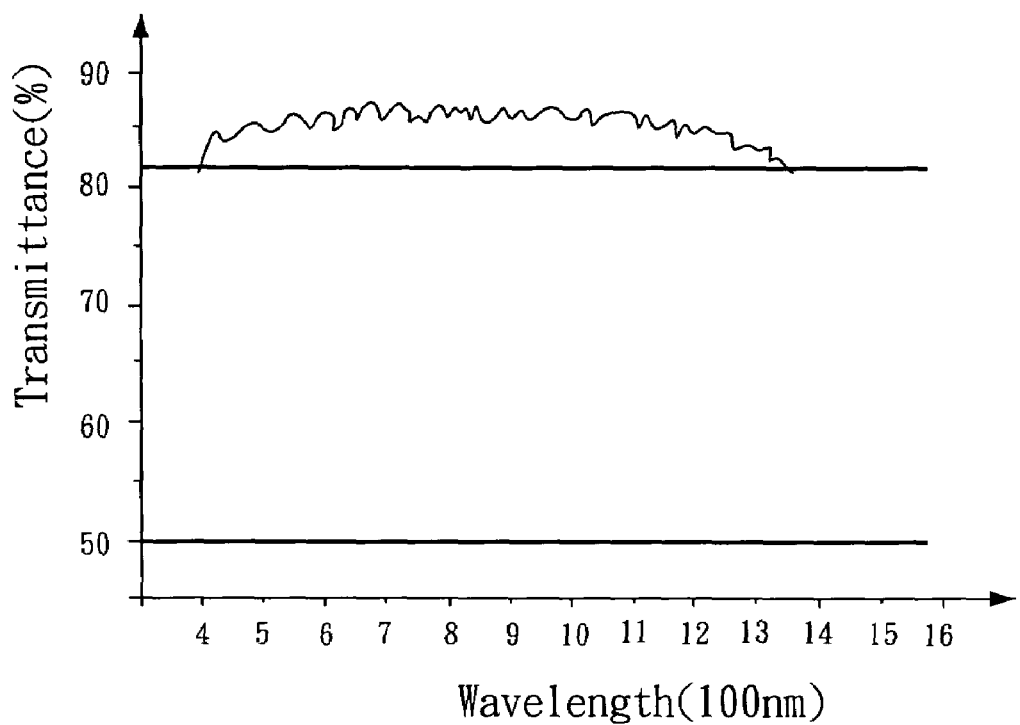
FIG. 3(A) shows the optical characteristic of typical transparent materials.
Figure 3B:
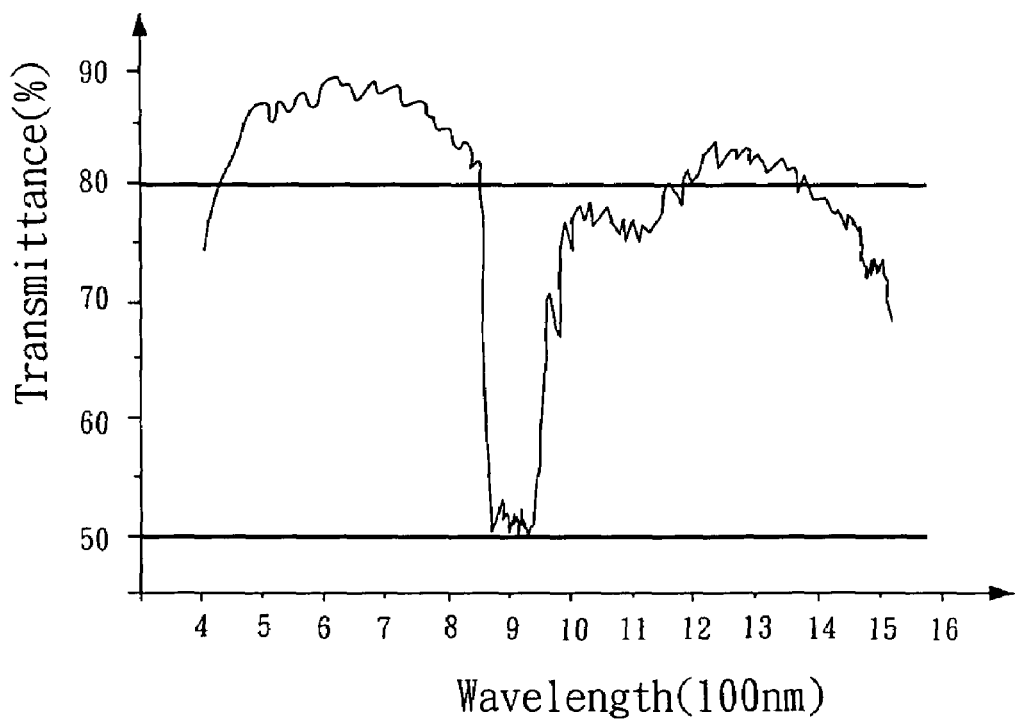
FIG. 3(B) shows the optical characteristic of the readable materials to the optical reader.

In this embodiment, the indexes (610, 611) are printed using readable materials to the optical reader 300. As shown in FIG. 3, FIG. 3(A) shows the optical characteristic of typical transparent materials, and FIG. 3(B) shows the optical characteristic of the readable materials to the optical reader 300. From the optical characteristics, it is known that, similar to the transparent materials, the readable materials to the optical reader 300 have a high transmittance (more than 80%) except for the light with wavelength of 850~950 nm (at which the transmittance is about 50%), and thus the readable materials can be disposed on the screen 400. With such readable materials having a feature of reflecting light with a special wavelength (850 nm~950 nm), when a special light (with the wavelength of 850 nm~950 nm) irradiates, the readable materials on the indexes (610, 611) can reflect the special light such that the sensor 330 senses a bright dot at which the indexes (610, 611) locate. Light illuminating on the other portion passes there through to the screen 40 for being scattered or absorbed, and thus the sensor 330 senses a dark area at which no indexes locates. The filter 320 allows a light with a wavelength of 850 nm~950 nm to pass through, thereby obtaining a reflective light respectively at positions with the indexes (610, 611).

Figure 4:
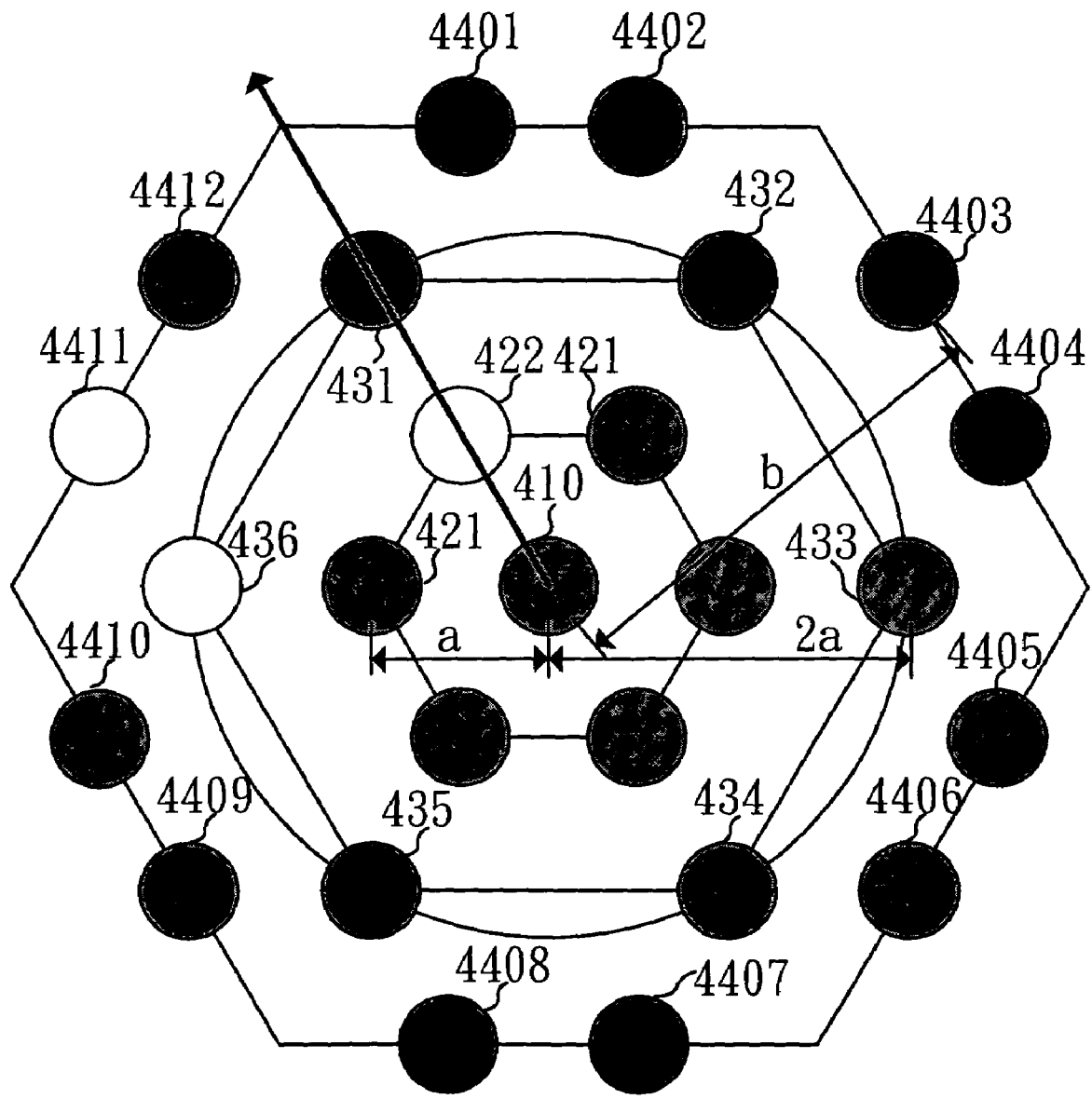
FIG. 4 schematically shows an index printed on the surface sensitive input device of FIG. 1 in accordance with the invention.

FIG. 4 schematically shows an index 610 or 611 in accordance with the invention. As shown, each index consists of plural indexing dots. The indexing dots are arranged in isotropic, each indexing dot having a radius of about 100 μm. The dots include a center dot 410, plural direction dots 421 and 422, plural first data dots 431-436 and plural second data dots 4401-4412. In this embodiment, each index 610 or 611 has six direction dots 421 and 422 respectively located on a first distance (a) from the center dot 410, thereby providing a direction indication, wherein the first distance (a) is about 400 μm. The direction indication is provided with the direction dot 422 as a direction recognition dot to indicate a start of indexing direction with respect to the center dot 410. The direction recognition dot 422 can be a blank or hollow dot, which represents no dot printed.

As shown in FIG. 4, each index 610 or 611 has six first data dots 431-436 respectively located on a second distance (2a) from the center dot 410, thereby providing a first data indication, wherein the second distance (2a) is greater than the first distance (a). In this case, the second distance (2a) is twice the first distance (a). The first data dots 431-436 can be a blank or solid dot to represent logic 0 or 1 each. The first data indication is arranged in a clockwise or counterclockwise direction starting with one of the six first data dots that locates on a same line of connecting the direction recognition dot 422 and the center dot 410. Namely, the first data indication indicates a value of $111110_b$ while the dot 431 represents the most significant bit (MSB) in the clockwise direction and a value of $011111_b$ while the dot 431 represents the least significant bit (LSB) in the counterclockwise direction.

Referring again to FIG. 4, each index 610 or 611 has twelve second data dots 4401-4412 respectively located on a third distance (b) from the center dot 410, thereby providing a second data indication, wherein the third distance (b) is greater than the second distance (2a). The second data dots 4401-4412 can be a blank or solid dot to indicate logic 0 or 1 each. The second data indication is arranged starting with one of the six first data dots that is the first one in a clockwise direction from a line including the direction recognition dot 422 and the center dot 410. Namely, the dot 4401 in FIG. 3 is an indexing start to represent the most significant bit (MSB), and accordingly the second data indication indicates a value of $111111111101_b$.

Figure 5:
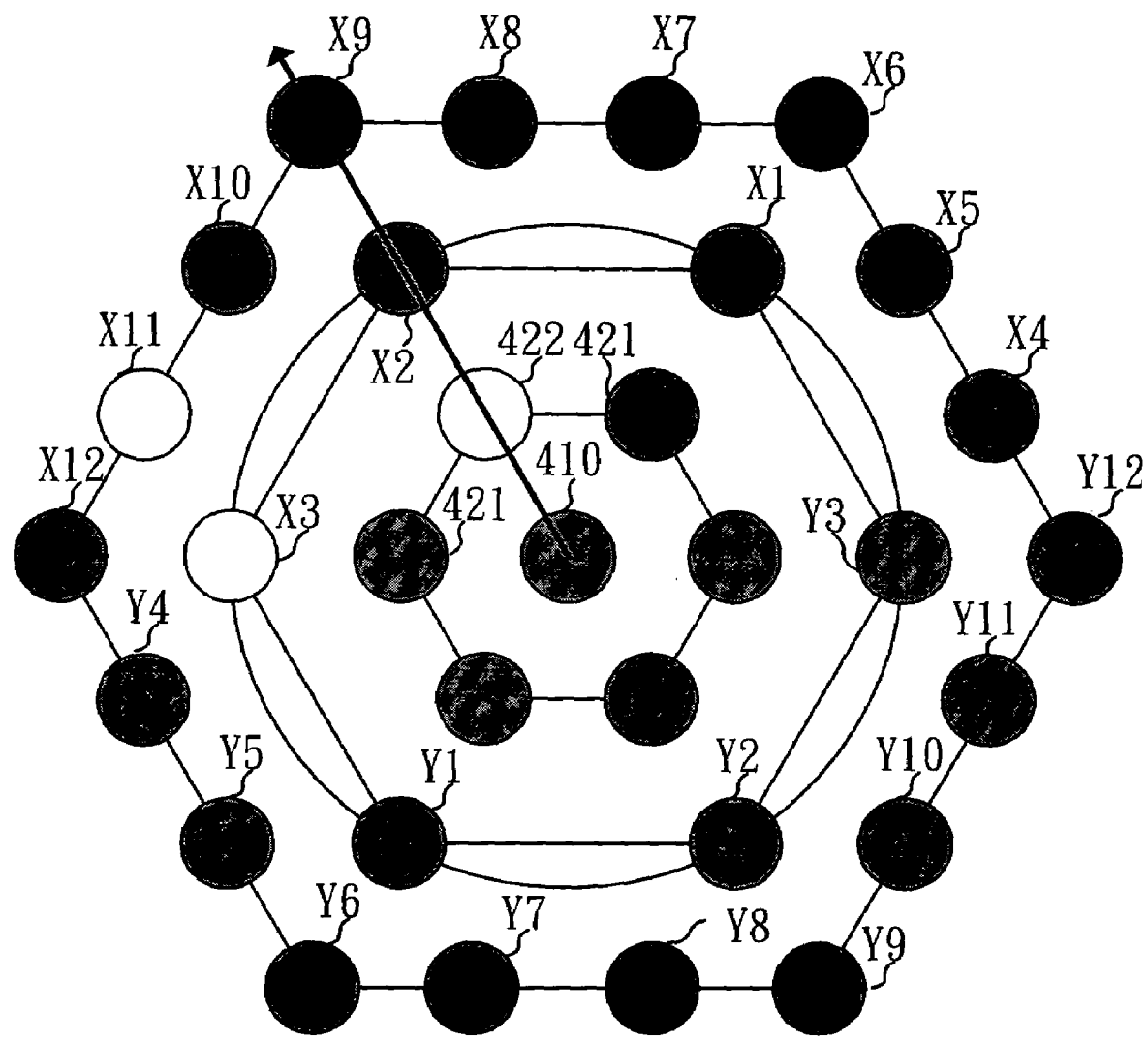
FIG. 5 schematically shows an XY-coordinate index in accordance with the invention.

FIG. 5 schematically shows another index in accordance with the invention. As compared to FIG. 4, the index shown in FIG. 4 has sixteen, not twelve, second data dots. In this case, the second data dots plus the first data dots equals to 22 (16+6) bits to respectively indicate X-coordinate x1 to x12 and Y-coordinate y1 to y12. It is to be understood that the above description for indexes shown in FIGS. 4 and 5 is for illustrative purpose only and various modifications may be imparted to these indexes without departing from the scope of the present invention.

Referring again to FIG. 1, the surface sensitive input device 200 is divided into plural areas (810, 811, . . . ) in a same size, each area having one or more indexes to indicate a respective area code or value. For example, area 810 has an index 610 and area 811 has an index 611. The host 100 can pre-store a lookup table, which stores a relation between the indexes and the corresponding coordinate. When the host 100 receives an index through the first interface 350, a coordinate of each area illuminated by the optical reader 300 can be obtained in accordance with the lookup table. The optical reader 300 and the host 100 are connected through the first interface 350, thereby sending all information of the indexes. The first interface 350 can be an RS232, PS2, USB, IEEE 1394, wireless transmission or infrared interface.

A direction of the index 610 or 611 may be not aligned in printing, or a user may place the direction leaning. However, due to the inventive direction indication, the index 610 or 611 can be read accurately by the optical reader system 300 in any direction, without finding an X-Y direction for accurately determining the index reading direction as required in the prior art.

This embodiment can directly print the indexes 610 and 611 on the screen 400 or adds a protect layer of transparent material having the indexes 610 and 611 over the screen 400. The transparent material can be a transparent glass or plastic. Accordingly, when the light source 310 of the optical reader 300 illuminates on the screen 400, the coordinate of all areas illuminated on the screen 400 can be obtained.

Figure 6:
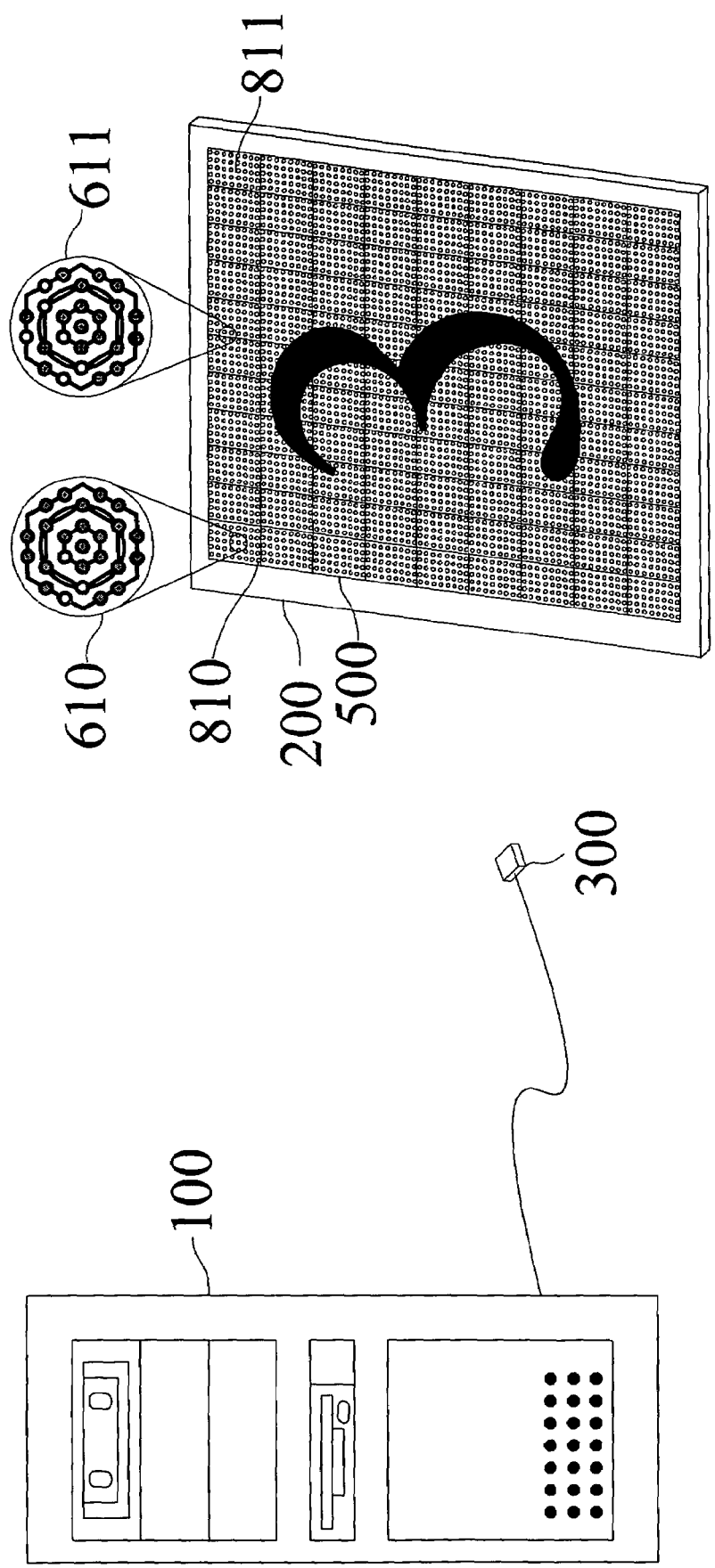
FIG. 6 schematically shows another embodiment of a computer system including a surface sensitive input device with indexes in accordance with the invention.

FIG. 6 schematically shows another embodiment of a computer system including a surface sensitive input device 200 with indexes in accordance with the invention. As shown, the computer system includes a host 100, the surface sensitive input device 200 and an optical reader 300. In this embodiment, the surface sensitive input device 200 can be a writing board 500, which is divided into plural areas (such as 810, 811), each area having one or more indexes (610, 611) to indicate a respective area code. The indexes are printed on the surface sensitive input device 200 by using special materials readable to the optical reader 300. The optical reader 300 is connected to the host 100 and adapted to read the indexes on the board 500, thus the indexes (610, 611) read are sent to the host 100 to further process.

Referring to FIG. 6, as a user uses the optical reader 300 to write a word (such as '3') on the writing board 500, the reader 300 reads all indexes on all areas containing the word. The light source 310 is a light with a desired wavelength to illuminate the areas containing the word written. The filter 320 passes through the desired light (with a wavelength of 850 nm~900 nm) to thus obtain a reflective light corresponding to the indexes 610 and 611. The pattern sensor 330 is connected to the filter 320 for sensing the light passing through the filter 320 and accordingly forming a pattern to output.

The pattern decoder 340 is connected to the pattern sensor 330 for decoding in accordance with the pattern and accordingly obtain corresponding information of the indexes. The first interface 350 is coupled between the pattern decoder 340 and the host 100, such that the decoder 340 can recognize the word written by the user from its writing pattern in accordance with the corresponding information and next sends the word recognized to the host 100 through the first interface 350. Thus, the coordinate of all indexes containing the word on the board 500 is obtained.

Therefore, the pattern decoder 340 can directly send the pattern output by the pattern sensor 330 to the host 100 through the first interface 350 for further processing, such as decoding an index, recognizing a writing pattern.

In view of the foregoing, the invention arranges one or more indexes 610 and 611 on the surface sensitive input device 200, which represent a respective area. Next, the optical reader 300 uses the light source 310 to illuminate the device 200 for obtaining the coordinate of all areas illuminated. In addition, since the invention directly prints the indexes 610 and 611 on the device 200 or adds a protect layer of transparent material having the indexes 610 and 611 over the device 200, the screen 400 of the device 200 is not touched directly. Thus, the prior problem that the touch screen is easily aged to be insensitive in use and hard renewed is overcome.

Although the present invention has been explained in relation to its preferred embodiment, it is to be understood that many other possible modifications and variations can be made without departing from the spirit and scope of the invention as hereinafter claimed.

What is claimed is:

1. A surface sensitive input device with indexes, which is divided into plural areas, each area having one or more indexes to represent a respective area code, the indexes being readable to an optical reader for extraction and printed on the surface sensitive input device, wherein each of the indexes has plural indexing dots in an isotropic arrangement, one of the indexing dots being a center dot for locating the indexes, the optical reader having a pattern sensor to sense a bright dot at a location of the indexes and a dark area where no index is located.

2. The input device as claimed in claim 1, wherein the indexes are printed using a readable material to the optical reader.

3. The input device as claimed in claim 2, wherein the readable material has a feature of reflecting light with a desired wavelength.

4. The input device as claimed in claim 3, wherein the readable material is transparent except for light with the desired wavelength.

5. The input device as claimed in claim 4, wherein the desired wavelength is 850~950 nm.

6. The input device as claimed in claim 1, wherein the indexing dots further have plural direction dots distributed on a first distance from the center dot, thereby providing a direction indication.

7. The input device as claimed in claim 6, wherein one of the direction dots is a blank or hollow direction recognition dot as an indexing start to accordingly form an indexing direction, which connects the direction recognition dot and the center dot into a line.

8. The input device as claimed in claim 7, wherein the indexing dots further have plural first data dots distributed on a second distance from the center dot, thereby providing a first data indication with a start of one first data dot located on the line, wherein the second distance is greater than the first distance.

9. The input device as claimed in claim 8, wherein the indexing dots further have plural second data dot distributed on a third distance from the center dot, thereby providing a second data indication, wherein the third distance is greater than the second distance.

10. The input device as claimed in claim 1, wherein the surface sensitive input device is a display screen or a writing board.

11. The input device as claimed in claim 1, wherein the indexes are formed on a protect layer of transparent material arranged on the surface sensitive input device.

12. The input device as claimed in claim 11, wherein the transparent material is a transparent glass or plastic.

13. A surface sensitive input device with indexes, which is divided into plural areas, each area having one or more indexes to represent a respective area code, the indexes being readable to an optical reader, the optical reader having a pattern sensor to sense a bright dot at a location of the indexes and a dark area where no index is located, wherein each of the indexes has plural indexing dots in an isotropic arrangement, and the indexing dots comprise:

a center dot being on a center of the index;

plural direction dots distributed on a first distance from the center dot, one of the direction dots being a blank or hollow direction recognition dot to indicate a start of indexing and form a direction of indexing by connecting the direction recognition dot and the center dot as a line; and plural first data dots distributed on a second distance from the center dot for providing a first data indication with a start of one first data dot located on the line, wherein the second distance is greater than the first distance.

14. The input device as claimed in claim 13, wherein each of the indexes further has plural second data dots distributed on a third distance from the center dot, wherein the third distance being greater than the second distance.

15. The input device as claimed in claim 13, wherein the second distance is twice of the first distance.

16. The input device as claimed in claim 13, wherein the indexes are printed using a readable material to the optical reader.

17. The input device as claimed in claim 16, wherein the readable material has a feature of reflecting light with a desired wavelength.

18. The input device as claimed in claim 17, wherein the readable material is transparent except for light with the desired wavelength.

19. The input device as claimed in claim 18, wherein the desired wavelength is 850~950 nm.

20. The input device as claimed in claim 13, further comprising a display screen or writing board as the surface sensitive input device.

21. The input device as claimed in claim 13, wherein the indexes are printed on the surface sensitive input device.

22. The input device as claimed in claim 13, wherein the indexes are formed on a protect layer of transparent material arranged on the surface sensitive input device.

23. The input device as claimed in claim 22, wherein the transparent material is a transparent glass or plastic.

* * * * *